Oct. 5, 1965     E. J. HERBENAR     3,210,108
JOINT WITH INTEGRAL LINER AND SEAL
Filed March 8, 1962
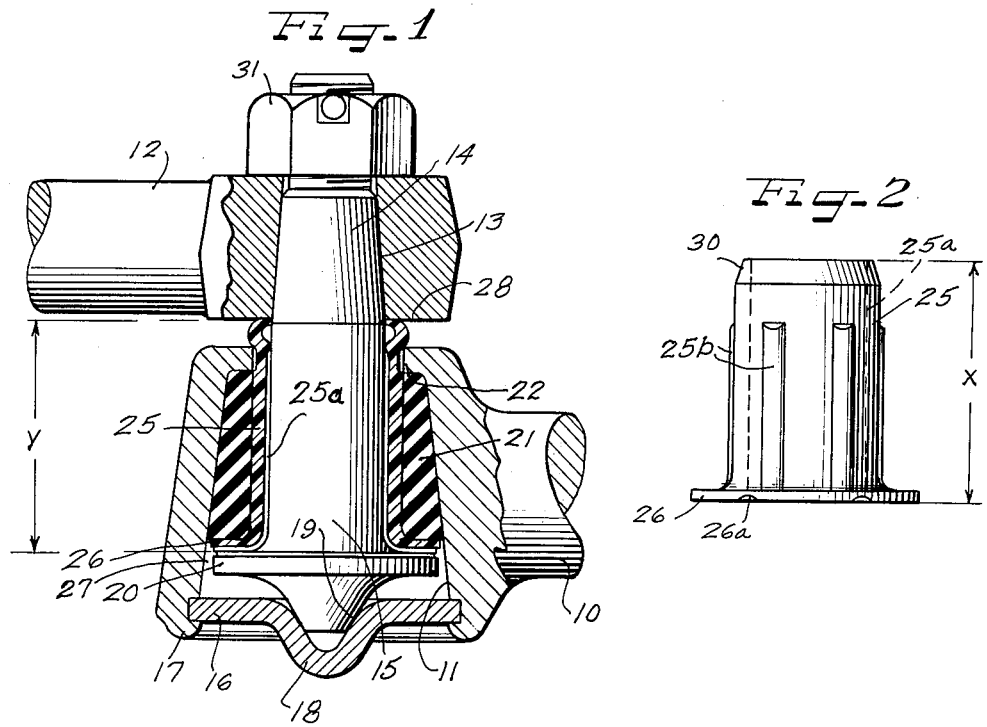
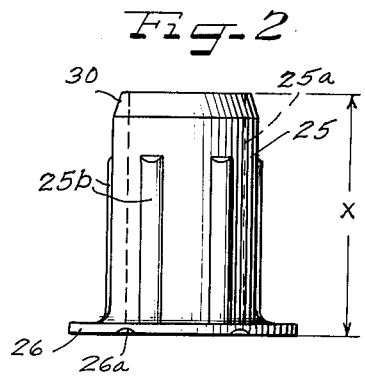
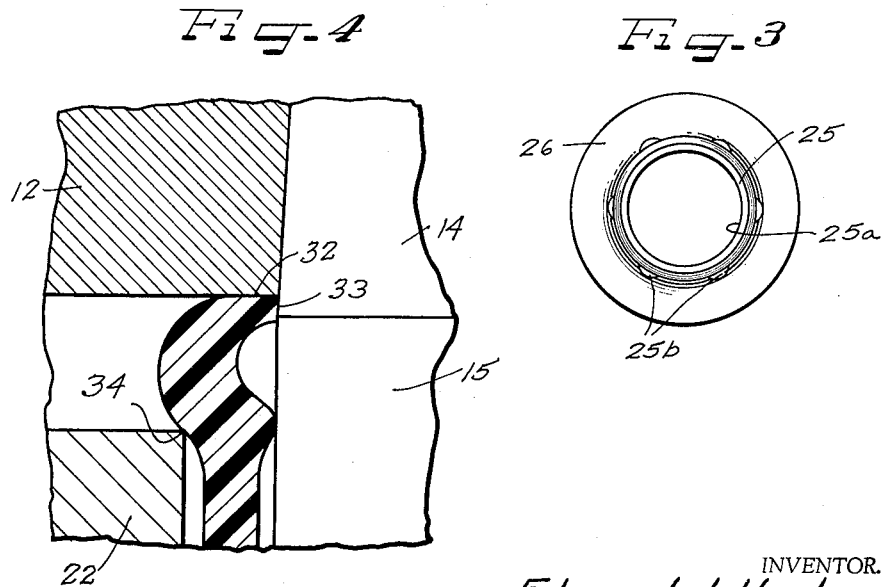
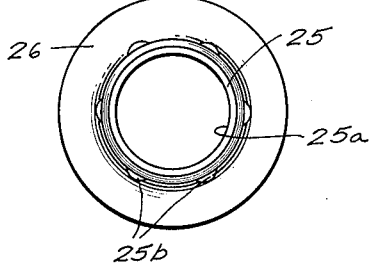
INVENTOR.
*Edward J. Herbenar*
BY
*Hill, Sherman, Meroni, Gross & Simpson*
ATTORNEYS United States Patent Office 3,210,108
Patented Oct. 5, 1965

3,210,108
JOINT WITH INTEGRAL LINER AND SEAL
Edward J. Herbenar, Detroit, Mich., assignor to Thompson Ramo Wooldridge Inc., Detroit, Mich., a corporation of Ohio
Filed Mar. 8, 1962, Ser. No. 178,507
2 Claims. (Cl. 287—93)

The present invention relates to an improved resilient joint construction and, more particularly, is concerned with the provision of a novel and substantially improved pivot joint employing a self-lubricating type plastic liner which simultaneously provides a bearing surface and a sealing surface.

As those skilled in the art are aware, joints of the type providing a thin self-lubricating plastic liner as a bearing surface for pivotal motion, have been very successfully used in recent years. In many uses such pivot joints have had acceptable life with only an initial greasing and without any special provisions for sealing the joints to maintain the initial grease in position. However, it has been found in practice, particularly in the automotive field, that the loss of the initial grease from the socket under relatively heavy loads, has caused an unsatisfactory shortness of life in such heavy-duty uses. It has been found very desirable to prevent the egress of the initial supply of grease from the joint and where successful measures have been employed in retaining this initial grease in the socket, such joints have successfully withstood very extended use without subsequent greasings.

In accordance with the present invention, means have been provided for sealing pivot joints of the type above described. This sealing is accomplished in accordance with the present invention in an extramely simple manner without the addition of parts to the joint. Accordingly, when the structure of the present invention is employed, a very satisfactory sealed joint construction is provided which is of no additional expense beyond the cost of the unsealed joints heretofore employed. At the same time, a positive seal is provided in the joint which prevents the loss of the initially applied grease and, accordingly, which lengthens the useful life, under heavy-duty loads, very materially.

In accordance with the present invention, a joint is constructed between a socket member and a link member carrying a stud. The stud is rigidly secured to the link and has an enlarged head portion thereon. The stud is seated in the socket with the shank thereof passing through a reduced diameter portion of the socket and with a resilient bushing positioned between the enlarged head on the stud and the reduced diameter portion of the socket. The bushing is provided with a thin plastic liner which slides in rotatable bearing relation on the stud shank and is positioned axially of the stud by a flange seated against the enlarged head of the stud. The liner is positioned fixedly relative to the resilient bushing so that upon rotation of the stud relative to the socket, the liner rotates with the socket. The end of the liner opposite the flange thereof is provided with a neck adapted to yield upon axial compression and is constructed of a length to provide an interference fit with the link when the stud shank is rigidly secured thereto. Accordingly, upon assembly of the stud shank with the link a deflection occurs at the end of the liner positively sealing the inside of the joint, and particularly the area between the stud shank and the liner, from ingress or egress of fluid or dirt. Thus, by the extension of the plastic liner for co-operative relationship with the link and by providing for fixation of the liner relative to the socket, an extremely inexpensive seal, and yet a highly efficient one is provided.

It is, accordingly, an object of the present invention to provide an improved, extremely simple, swivel joint having an integral bearing and seal.

Another object of the present invention is to provide an improved seal for resilient swivel joints.

Still a further object of the present invention is to provide a bearing liner axially fixed relative to a stud member upon which it is rotatably mounted, wherein the liner simultaneously provides a seal of the fluid between the liner and the stud.

A feature of the invention resides in the provision of a flanged plastic bearing liner having an axially facing sealing neck integral therewith.

Yet a further feature of the invention is the cooperation of a resiliently positioned, thin plastic bearing liner with a relatively rotatable flat sealing face on the stud carrying link. Still other and further objects and features of the present invention will at once become apparent to those skilled in the art from a consideration of the attached drawings wherein one embodiment of the present invention is shown by way of illustration only, and wherein:

FIGURE 1 is a cross-sectional view, in elevation, of a swivel joint constructed in accordance with the present invention;

FIGURE 2 is a side-elevational view of the integral bearing and seal subcombination element utilized in accordance with the present invention;

FIGURE 3 is a plan view of the bearing element shown in FIGURE 2; and

FIGURE 4 is an enlarged view of the improved combined bearing and seal employed in accordance with the present invention, clearly illustrating the co-operation between the bearing liner and the associated joint parts.

As shown on the drawings:

As may be seen from a consideration of FIGURE 1, the embodiment illustrated comprises a first joint member 10 having a socket 11 and a second link member 12 having a tapered eye 13 for co-operation with the taper 14 of a stud shank 15. The housing socket 11 is provided with a closure cap 16 permanently positioned relative to the member 10 by a spun-over flange 17. The closure plate 16 is provided with a socket or guide depression 18 which co-operates with the protuberance 19 on the enlarged, flanged, head 20 of the stud. A generally cylindrical resilient bushing 21 is seated in the socket 11 between the reduced diameter neck portion 22 of the socket 11 and the flange 20. A plastic liner element 25, having a flange 26 thereon, is positioned in bearing relation with the shank 15. The surface 25a of the liner has a diameter slightly larger than the diameter of the stud shank 15 or, alternatively, may have a plurality of longitudinal grooves to provide a grease film between the liner and the stud shank. Similarly, grease grooves 26a are provided in the bottom surface of the flange 26 for co-operation with the flange 20 so that grease in the reservoir 27 has free access to the bearing areas of the stud and liner. As shown in FIGURE 2, the outside surface of the liner is provided with a plurality of ribs 25b which co-operate with the resilient bushing 21 to prevent relative rotation between the bushing 21 and the liner.

The liner 25 is provided with an axial length greater than the length indicated at Y in FIGURE 1. This length Y comprises the distance between the flange 20 of the stud head and the surface 28 of the link element 12. In practice it has been found that construction of the liner with an axial length X approximately .080 inch longer than the dimension Y, for a joint having a dimension Y approximating an inch in length, provides satisfactory action. In molding the liner 25, a tapered edge is provided at 30 so that as the link 12 is seated on the taper 14 and the nut 31 is tightened, in assembly, the edge turns inwardly as shown in FIGURE 4 providing a tight seal at surface 32 and at surface 33. The stiffness of the seal may be bolstered, if desired, by providing the corner 34 of the reduced diameter portion 21 of the socket in a position to interfere with the bulging of the liner upon assembly of the link 12. This specific configuration is not essential to operation of the device, however, since materials such as high molecular weight polyamides, or nylon, or polyethylene plastic bearing materials have sufficient stiffness in cylindrical configuration of the type illustrated to provide a seal when axially deformed. Limiting axial movement of the liner by the provision of shoulder 34, however, enables the provision of an extremely tight seal where desired.

It will be observed that in view of the interlocking of the liner 25 with the bushing 21, the liner will not rotate relative to the socket in normal use. Instead, the bearing surfaces of the liner 25 will slide relative to the shank 15 and the flange 20 of the stud. Accordingly, rotation will occur between the surfaces 32, 33 and the link 12. In view of the wedging sealing co-operation between these surfaces, however, grease positioned in the joint will not extrude out and, accordingly, the bearing liner operates to provide not only a very satisfactory bearing for the pivot joint but also as an effective seal, preventing egress of grease in the joint, and, also, preventing dirt from getting into the interior of the joint. As a result of the utilization of this integral liner and seal, the conventional sponge-type annular washer ordinarily positioned between the surface 28 of the link 12 and the upper end of the socket, has been eliminated without eliminating the function thereof. Further, in view of the memory characteristic of such materials as nylon, polyethylene and related self-lubricating plastics, the liner 25 continually attempts to return to its initial unstressed condition illustrated in FIGURE 2, with the result that the seal at the surfaces 32, 33 is constantly maintained over a long period of time. Accordingly, the greased-for-life condition of the joint of the present invention has been found to be unusually satisfactory, even under heavy-duty loads of the type employed in automotive steering linkages and the like.

In the embodiment of the invention illustrated, the socket 11 is provided with a longitudinal taper. It will be observed, however, that for purposes of the present invention, the socket may be cylindrical rather than tapered. It will be further apparent that the liner of the present invention could be employed with a spherical ball stud head rather than the flange 20 in structures in which the liner is held axially positioned relative to the stud by the enlarged head so that deflection of the upper end, in the manner shown in FIGURE 4, is required upon assembly of the parts 12 and 10. It will, further, be apparent to those skilled in the art that other variations may be made without departing from the scope of the novel concepts of the present invention and it is, accordingly, my intention that the scope of the present invention be limited solely by that of the hereinafter appended claims.

I claim as my invention:

1. In combination in a pivot joint, a socket member having a reduced diameter neck portion, a link member having a stud secured thereto with the shank thereof passing through the neck portion of the socket, an enlarged head portion on said shank positioned inside the socket at a point remote from the neck portion thereof, a plastic liner bearing member having a stiff generally cylindrical portion surrounding the shank in bearing relation therewith and an enlarged diameter portion seated against said head portion, means positioned between said liner and said socket for confining said liner in bearing contact with said stud and with said head, and means retaining said liner against rotation relative to said confining means, means closing the end of the socket remote from said neck portion and simultaneously loading said confining means, said liner extending through said neck portion and being substantially straight-sided at the portion thereof not confined to provide an extension outside said socket having one end positioned against the link and the other end positioned at said neck portion, said liner having an unstressed length along the stud greater than the distance between said head and said link member in its secured position, the said one end of said liner extension facing said link member having a beveled chamfer on the outer diameter thereof, said one end being radially outwardly bowed with the thin edge thereof facing said link necked radially inwardly into tight sealing engagement with said link and said stud shank providing a rotary seal therebetween and the other end of said extension engaging said neck portion for support of the liner thereby against uncontrolled lateral expansion thereof.

2. A pivot joint constructed in accordance with claim 1 wherein said means for confining said liner comprises a resilient bushing positioned between said liner and said socket member.

References Cited by the Examiner
UNITED STATES PATENTS

| | | | |
|---|---|---|---|
| 2,324,984 | 7/43 | Brown | 287—85 |
| 2,701,151 | 2/55 | Booth | 287—90 |
| 2,778,664 | 6/57 | Herbenar | 287—85 |
| 2,981,573 | 4/61 | Reuter | 308—238 X |
| 3,089,717 | 5/63 | Gair | 287—93 X |

CARL W. TOMLIN, *Primary Examiner.*